United States Patent Office 3,139,385
Patented June 30, 1964

3,139,385
METHOD FOR THE PRODUCTION OF 5'-NUCLEOTIDES
Koichi Ogata, Minoo, Osaka, Akira Imada, Nishinomiya, and Yoshio Nakao, Osaka, Japan, assignors to Takeda Chemical Industries, Ltd., Osaka, Japan
No Drawing. Filed Dec. 18, 1961, Ser. No. 160,355
Claims priority, application Japan Dec. 20, 1960
22 Claims. (Cl. 195—28)

This invention relates to a novel and useful method for producing 5'-nucleotides.

Production of 5'-nucleotides by utilizing microorganisms has hitherto been effected through either of the following two processes; (1) ribonucleic acid is desirably hydrolyzed by the action of phosphodiesterase produced by microorganisms or (2) microorganisms capable of producing 5'-nucleotides during the incubation and of accumulating the same in the medium are incubated under conditions suitable for the purpose. However, these known processes are necessarily accompanied with disadvantages when effected in an industrially large scale. More specifically, in the former process, microorganisms which are the source of ribonucleic acid—e.g. yeast—and microorganisms capable of producing the enzyme-system to desirably hydrolyze the ribonucleic acid into 5'-nucleotides must respectively be incubated. In the latter case, the objective 5'-nucleotides are to be accumulated during the incubation of microorganisms, the concentration of so-accumulated 5'-nucleotides is necessarily low.

On the other hand, the present inventors have succeeded in obtaining 5'-nucleotides directly from cells or mycelia of microorganisms, the nucleotides being produced from the intracellular ribonucleic acid of the microorganisms by the action of co-existing enzyme-system. The new process herein-presented is quite fit for practical application to an industrial production of 5'-nucleotides for which demand is now markedly increasing.

It is, therefore, the main object of this invention to provide a new and useful method for producing 5'-nucleotides, especially suitable for the production in an industrially large scale.

Another object of the invention is an improvement in diminishing troubles and disadvantages necessarily encountered with in effecting the hitherto-known processes for the production of 5'-nucleotides.

The method of the present invention is, broadly speaking, effected by suspending sufficiently grown microorganisms in an aqueous alkaline solution. For example, suitable microorganisms are suspended in a buffer solution or a salt solution of 0.1 to 0.3 molar concentration, and the suspension is kept at an alkaline pH of around 7.5 to 12, desirably 8 to 11, for about one to ten hours, when the suspension may be allowed to stand still or may be agitated and/or aerated. It should be stressed that more than 90 percent of intracellular ribonucleic acid of the microorganisms is excluded from the cells or the mycelia as 5'-nucleotides solely by subjecting the microorganisms to the treatment outlined above. Moreover, it is clear from Table I that the striking fact is not limited to the case in which the intracellular ribonucleic acid of the microorganisms is hydrolyzed by intracellular phosphodiesterase co-existing with the ribonucleic acid, because, in the case of those microorganisms which apparently produce phosphodiesterase to hydrolyze ribonucleic acid into 3'-nucleotides as well as in the case where the microorganisms have phosphodiesterase to hydrolyze nucleic acid into 5'-nucleotides, the greater part of the intracellular nucleic acid of the microorganisms is transformed into 5'-nucleotides. It is therefore considered, though the precise mechanism of said phenomena is not obvious, that the intracellular ribonucleic acid is not only hydrolyzed by the action of phosphodiesterase but also degraded into 5'-nucleotides through the reverse reaction by polynucleotidephosphorylase and the subsequent dephosphorylation, and that the 5'-nucleotides intracellularly produced are excluded to the medium through cell walls. This hypothetical interpretation is supported by the fact that a favorable result is obtained in this process when larger quantity of inorganic phosphates is added than as usual during the incubation of the microorganisms, and the fact that the intracellular deoxyribonucleic acid is hardly degraded and remains in cells or mycelia, etc. during the procedure.

TABLE I

| Microorganisms | Production of ribonucleic acid-hydrolyzing enzymes | | | | Yield (percent) of 5'-nucleotides from intracellular ribonucleic acid through the process of the present invention |
|---|---|---|---|---|---|
| | Phosphodiesterase to hydrolyze ribonucleic acid into 5'-nucleotides | | Phosphodiesterase to hydrolyze ribonucleic acid into 3'-nucleotides | | |
| | Intra-cellular | Extra-cellular | Intra-cellular | Extra-cellular | |
| Bacillus pumilus | − | − | − | − | 92 |
| Pseudomonas graveolens | + | − | − | − | 90 |
| Rhodotorula glutinis | + | − | + | + | 86 |
| Streptomyces aureus | + | + | − | − | 70 |
| Penicillium corymbiferum | − | − | + | + | 45 |

Remarks: +: The microorganism produces the enzyme.
−: The microorganism does not produce the enzyme.

It has been newly found by the present inventors that almost all intracellular ribonucleic acid can be degraded into 5'-nucleotides when the microorganisms are kept suspended in an alkaline medium under suitable conditions and that the so-produced 5'-nucleotides come out of cells or mycelia into the medium. The present invention has been accomplished on the basis of said findings and investigations further made by the present inventors. In addition, the possible interpretation directed to the reverse reaction on polynucleotidephosphorylase and to the dephosphorylation also has never been observed by anyone else.

The microorganisms to be used for the purpose of the present invention can be selected from bacteria, yeasts, fungi imperfecti, molds, actinomycetes, etc. The under-listed names of microorganisms are only exemplary of those utilizable for the method of the present invention and not to limit the scope of the invention.

Bacteria:
  Acetobacter suboxydans Kluyver et De Leeuw,
  Achromobacter liquidum (Fr. et Fr.) Bergey et al.,
  Aerobacter aerogenes (Kruse) Beijerinck,
  Agrobacterium tumefaciens (Smith et Townsend) Conn,
  Bacillus brevis Migula emend. Ford,
  Bacillus cereus Frankland et Frankland,
  Bacillus megatherium De Bary,
  Bacterium mycoides (Grotenfelt) Migula,
  Erwina carotovora (Jones) Holland,
  Escherichia coli (Migula) Castellani et Chalmers,
  Micrococcus subflavus Flügge,
  Mycobacterium avium Chester,
  Proteus vulgaris Hauser,
  Pseudomonas aeruginosa (Schroeter) Migula,
  Pseudomonas fragi (Eichholze) Huss emend. Hussong et al.,
  Pseudomonas graveolens Levine et Anderson, Bacteria:—Continued
  *Sarcina lueta* Schroeter,
  *Serratia marcescens* Bizio,
  *Streptococcus liquefaciens* Sternberg emend. Orla-Jensen,
  *Vibrio percolans* Mudd et Warren,
  *Xanthomonas malvacearum* (Erw. Smith) Dowson, etc.;

Yeasts:
  *Candida robusta* Diddens et Lodder,
  *Cryptococcus neoformans* (Sanfelice) Vuillemin,
  *Debaryomyces globosus* Klöcker,
  *Endomyces magnusii* Ludwig,
  *Hansenula anomala* (Hansen) H. et P. Sydow
  *Hanseniaspora valbyensis* Klöcker,
  *Kloeckera apiculata* (Reess emend. Klöcker) Janke,
  *Mycoderma mandshurica* Saito,
  *Pichia membranaefaciens* Hansen,
  *Rhodotorula flava* (Saito) Lodder,
  *Rhodotorula glutinis* (Fres.) Harrison,
  *Rhodotorula pallida* Lodder,
  *Saccharomyces cerevisiae* var. *ellipsoideus* (Hansen) Dekker,
  *Saccharomyces exiguus* Hansen
  *Saccharomyces miso* δ Mogi
  *Saccharomyces miso* δ var. 2 Mogi,
  *Saccharomyces rouxii* Boutroux,
  *Schizosaccharomyces pombe* Lindner,
  *Schwanniomyces occidentalis* Klöcker,
  *Sporobolomyces pararoseus* Olson et Hammer,
  *Torulopsis colliculosa* (Hartmann) Saccardo,
  *Zygopichia miso* Mogi,
  *Zygosaccharomyces naniwaensis* Ohtani II, etc.;

Fungi Imperfecti:
  *Fusarium roseum* Link,
  *Acrocylindrium* sp. (Kurata)
  *Gliomastix convoluta* (Harz) Mason var. *felina* (Marchal) Mason,
  *Helminthosposium sigmoideum* var. *irregulare* Cralley et Tullis, etc.;

Molds:
  *Aspergillus quercinus* (Bainier) Thom et Church,
  *Botryosphaeria ribis* chromogena G. et D.,
  *Glomerella cingulata* (Stonem.) Spauld. et v. Schr.,
  *Sordaria fimicola* (Rab.) Cesari et de Notaris, etc.;

Actinomycetes:
  *Streptomyces aureus* (Waksman et Curtis) Waksman et Henrici,
  *Streptomyces flaveolus* (Waksman) Waksman et Henrici,
  *Streptomyces olivaceus* (Waksman) Waksman et Henrici, etc.

The cultivation of the microorganisms is carried out in an aqueous culture medium. It is usually required that the culture medium contain such nutrients for the microorganisms as assimilable carbon sources, digestible nitrogen sources, and preferably, inorganic substances, vitamins, trace elements, other growth promoting factors, etc. These nutrients may of course be obtained from natural sources or may be synthetic. As the carbon sources there may be used, for example, glucose, lactose, maltose, glycerol, starch, dextrin, etc.; as the nitrogen sources, for example, ammonium salts, nitrates, urea, etc.; as carbon and nitrogen sources, for example, peptone, meat extracts, yeast extracts, soy-bean flour, corn-steep liquor, molasses, casein, casein hydrolyzates, gluten, rice bran, a variety of amino acids, etc.; and as the inorganic nutrients, for example, potassium phosphate, sodium chloride, magnesium sulfate, ferric chloride, sodium nitrate, calcium chloride, etc. Among those inorganic nutrients, phosphates preferably in the form of salts formed with ammonium, sodium or potassium, which are soluble in water, are useful for the incubation in view of their activity to make the yield of 5'-nucleotides increase as mentioned above as well as in view of their efficiency as nutrients.

The incubation is usually carried out for about 10 to 72 hours at a temperature of about 25 to 30° C., but the optimum period of the incubation varies in accordance with such factors as the kind of microorganisms, the composition of media, the temperature, whether the medium is agitated or not, etc. The microorganisms thus sufficiently cultivated contain ribonucleic acid in a quantity of about 4 to 18 percent relative to their dried body weight.

In the next stage, the resulting raw cells or raw mycelia of the microorganisms are kept at a pH of about 7.5 to 12, desirably 8 to 11. For this purpose, the microorganisms may or may not be separated from the culture medium. When they are separated from the culture medium, they are then suspended in an aqueous medium. As the aqueous medium, those are preferably usable which are prepared by dissolving in water desirable quantities of solutes such as glycine, trisaminomethane, sodium chloride, ammonium chloride, potassium chloride, borax, sodium phosphates, potassium phosphates, ammonium sulfate, sodium acetate, sodium citrate, or the like. For the same purpose, a known buffer solution such as tris(hydroxymethyl)aminomethane buffer solution (hereinafter referred to tris buffer solution) may be conveniently employed. The suspension is usually allowed to stand or shaken or agitated for 1 to 10 hours at a temperature of about 30 to 45° C. While, it may, in some case, be preferable to subject the microorganisms, prior to the suspension process, to a physical treatment such as freezing for the purpose of somewhat damaging the envelopes of the cells. In this manner the period required for the suspension process can be shortened.

When the microorganisms are to be subjected to the alkaline pH without being separated from the culture medium, the culture medium should be adjusted to an alkaline pH of about 7.5 to 12, desirably 8 to 11, for example, by the addition of such solutes as enumerated in the preceding paragraph. Further treatment may be carried out in a similar manner to the above-mentioned suspension process.

It may result in shortening the period required for the accumulation of 5'-nucleotides in the medium to treat the sufficiently grown microorganisms with a chemical agent such as phenol, cresol, sodium deoxycholate, etc. to damage the envelopes of the cells before or while the microorganisms are kept in the medium suspended.

Furthermore, it is noteworthy that the addition of a chemical agent providing polybasic anions such as phosphates, pyrophosphates, polyphosphates, arsenates, citrates, etc. to the media in which the microorganisms are kept suspended often results in the enhanced yield of 5'-nucleotides.

According to said treatments, 80 to 100 percent of the intracellular ribonucleic acid disappears and 60 to 90 percent of the same is changed into 5'-nucleotides such as 5'-adenylic acid, 5'-guanylic acid, 5'-cytidylic acid and 5'-uridylic acid which come out of mycelia or cells into the surrounding medium and accumulated therein. In the case of the microorganism producing 5'-adenylic acid deaminase, 5'-inosinic acid may be accumulated in place of 5'-adenylic acid.

When the activity of nucleotidases is too strong, the undesirable results of dephosphorylation are avoidable by adding to the medium a nucleotidase-inhibitor such as arsenates or the like.

The invention will now be described in further particularity by means of the following examples. It will be understood, of course, that the invention is not limited to the particular details of these examples since they only set forth preferred exemplary embodiments of the invention. In these examples, the percentages with regard to the compositions of media are of weight per volume and the others are on a weight basis. Temperatures are all uncorrected and shown in centigrade. Numbers and abbreviations attached to the names of microorganisms show the respective accession numbers to the strain in Northern Utilization Research Branch of U.S. Department of Agriculture, Peoria, Ill., U.S.A. (NRRL) or in American Type Culture Collection, Washington, D.C., U.S.A. (ATCC).

Example 1

Bacillus sp. (ATCC–14552) was incubated for 24 hours at 30° C. in 20 liters of an aqueous medium in a tank, the medium containing 5.0 percent of corn-steep liquor, 4.0 percent of sodium acetate, 0.7 percent of dipotassium hydrogen phosphate, 0.2 percent of potassium dihydrogen phosphate and 0.05 percent of magnesium sulfate. After the incubation, the resulting cells were collected to weigh 800 grams in which 15 percent of ribonucleic acid relative to dried cell weight—the quantity of the raw cells corresponds to 156 grams of their dried cell weight. The raw cells were allowed to stand for 30 minutes at 0° C., and suspended in 10 liters of 0.25 molar glycine-sodium hydroxide buffer solution being adjusted at pH 9.4. The suspension was allowed to stand for 2 hours at 37° C., and then filtered to be separated into cells and filtrate. The separated cells were washed with water and the washings were combined with the filtrate. The resultant solution was adjusted at pH 2.0 with hydrochloric acid, and allowed to pass through the column packed with active charcoal, whereupon nucleotides were adsorbed on the charcoal. The nucleotides on the charcoal were eluted out with ethanol alkalified with ammonia. The nucleotides in effluent were purified by the use of anion exchange resins to give 6.5 grams of 5'-adenylic acid, 6.2 grams of 5'-quanylic acid, 5.2 grams of 5'-cytidylic acid and 4.6 grams of 5'-uridylic acid.

In the process of this example, when the suspension process was carried out in the medium added disodium hydrogen phosphate to make its concentration 25 millimoles, the same yield was obtained within 40 minutes after the start.

Example 2

Pseudomonas graveolens Levine et Anderson (NRRL, B–14) was incubated for 18 hours at 30° C. in 50 liters of an aqueous medium in a tank, the medium containing 3.0 percent of corn-steep liquor, 0.5 percent of urea, 5.0 percent of glucose, 0.7 percent of disodium hydrogen phosphate, 0.2 percent of potassium dihydrogen phosphate and 0.05 percent of magnesium sulfate. After the incubation, resulting cells were collected to weigh 1.8 kilograms in which 12 percent of ribonucleic acid relative to dried cell weight is contained—the weight of the raw cells corresponds to 370 grams of the dried cell weight. The raw cells were suspended in 25 liters of 0.2 molar sodium chloride solution and the suspension was agitated for 3 hours at a pH adjusted to 9.4 with sodium hydroxide. Then, the suspension was filtered to separate cells from filtrate. The cells were washed with water and the washings were combined with the filtrate. From the combined solution, 12 grams of 5'-adenylic acid, 9 grams of 5'-guanylic acid, 7 grams of 5'-cytidylic acid and 6.5 grams of 5'-uridylic acid were obtained.

Example 3

Schizosaccharomyces pombe Lindner (ATCC–14548) was incubated for 18 hours at 30° C. in 10 liters of an aqueous medium under shaking, the medium containing 10.0 percent of molasses, 3.0 percent of corn-steep liquor, 0.5 percent of urea, 0.1 percent of dipotassium hydrogen phosphate, 0.6 percent of potassium dihydrogen phosphate and 0.05 percent of magnesium sulfate. After the incubation, resultant cells were collected to weigh 640 grams in which 11.5 percent of ribonucleic acid relative to dried cell weight is contained—the weight of the raw cells corresponds to 180 grams of the dried cell weight. The raw cells were kept frozen overnight at −25° C., thawed and suspended in 7 liters of 0.25 molar tris buffer solution being adjusted at pH 9.0, and the suspension was agitated for 5 hours at 37° C. Thereafter, the suspension was filtered to separate cells. The cells were washed with water and the washings were combined with the filtrate. From the resulting solution, 3.2 grams of 5'-adenylic acid, 3.1 grams of 5'-guanylic acid, 2.4 grams of 5'-cytidylic acid and 2.5 grams of 5'-uridylic acid were obtained.

In the process of this example, when the separated raw cells were at once suspended in the buffer solution without being kept frozen, less yield of 5'-nucleotides, i.e. 2.4 grams of 5'-adenylic acid, 2.1 grams of 5'-guanylic acid, 1.8 grams of 5'-cytidylic acid and 1.9 grams of 5'-uridylic acid, were obtained.

Example 4

Saccharomyces miso δ var. 2 Mogi (ATCC–14549) was incubated for 16 hours at 28° C. in 30 liters of an aqueous medium in a tank, the medium containing 5.0 percent of glucose, 0.5 percent of meat extract, 0.2 percent of yeast extract and 0.05 percent of magnesium sulfate. After the incubation, resulting cells were collected to weigh 2.3 kilograms in which 10.5 percent of ribonucleic acid relative to dried cell weight is contained—the weight of the raw cells corresponds to 450 grams of the dried cell weight. The raw cells were suspended in 15 liters of 0.25 molar glycine-sodium hydroxide buffer solution being adjusted at pH 10.5 and the suspension was agitated for 6 hours at 37° C. Thereafter, the suspension was filtered to separate cells. The cells were washed with water and the washings were combined with the filtrate. From the resulting solution, 8.4 grams of 5'-adenylic acid, 5.1 grams of 5'-guanylic acid, 4.2 grams of 5'-cytidylic acid and 4.8 grams of 5'-uridylic acid were obtained.

Example 5

Saccharomyces rouxii Boutroux (ATCC–14550) was incubated for 18 hours at 28° C. in 5 liters of an aqueous medium under shaking, the medium containing 10.0 percent of molasses, 3.0 percent of corn-steep liquor, 0.5 percent of urea, 0.1 percent of dipotassium hydrogen phosphate, 0.6 percent of potassium dihydrogen phosphate and 0.05 percent of magnesium sulfate. After the incubation, resulting cells were collected to weight 380 grams in which 12.0 percent of ribonucleic acid relative to dried cell weight is contained—the weight of the raw cells corresponds to 75 grams of the dried cell weight. The raw cells were suspended in 2 liters of 0.25 molar tris buffer solution being adjusted at pH 9.0 and the suspension was agitated for 4 hours at 37° C. Thereafter, the suspension was filtered to separate cells. The cells were washed with water and the washings were combined with the filtrate. From the resulting solution, 1.5 grams of 5'-adenylic acid, 1.1 grams of 5'-guanylic acid, 0.95 gram of 5'-cytidylic acid and 1.1 grams of 5'-uridylic acid were obtained.

Example 6

Rhodotorula flava Lodder (ATCC–14551) was incubated for 20 hours at 28° C. in 30 liters of an aqueous medium in a tank, the medium containing 5.0 percent of glucose, 0.5 percent of peptone, 0.5 percent of meat extract, 0.2 percent of yeast extract, 0.05 percent of magnesium sulfate, 0.2 percent of potassium nitrate and 0.01 percent of calcium chloride. After the incubation, resulting mycelia were collected to weigh 2,050 grams—the weight corresponds to 410 grams of the weight of dried mycelia. The raw mycelia were suspended in 10 liters of 0.25 molar tris buffer solution of pH 7.5. The suspension was agitated for 6 hours at 37° C. and filtered to separate mycelia. The mycelia were washed with water and the washings were combined with the filtrate. From the resulting solution, 7.1 grams of 5'-adenylic acid, 5.2 grams of 5'-guanylic acid, 4.0 grams of 5'-cytidylic acid and 4.3 grams of 5'-uridylic acid were obtained.

Example 7

Pseudomonas graveolens Levine et Anderson (NRRL, B-14) was incubated for 28 hours at 28° C. in 30 liters of an aqueous medium under aeration and agitation, the medium containing 1.0 percent of glucose, 0.7 percent of di-potassium hydrogen phosphate, 0.2 percent of potassium dihydrogen phosphate, 0.42 percent of yeast extract, 0.02 percent of magnesium sulfate and 0.1 percent of ammonium sulfate. After the incubation, the resulting cells were collected by using Scharples type centrifuge, whereupon 750 grams of wet cells were obtained, the weight corresponding to 140 grams of dried cell weight and to about 14 grams of the ribonucleic acid therein. The wet cells were suspended in 10 liters of an aqueous solution of pH 7.0 containing 0.5 percent of corn-steep liquor, 0.4 percent of dipotassium hydrogen phosphate, 0.1 percent of potassium dihydrogen phosphate, 0.5 percent of glycerol, 1.0 percent of sodium acetate, 0.2 percent of yeast extract, 0.01 percent of magnesium sulfate and 0.2 percent of ammonium sulfate. The suspension was kept at 30° C. under aeration and agitation. After 4 hours, the content of ribonucleic acid in the cells increased to 18 grams and the pH of the suspension shifted to 7.8. At this stage, the cells have extraordinary grown to shape quite long bacilli contrary to short bacilli as they had shaped during said pre-incubation. On further agitation, the pH of the medium elevated more and more and the content of ribonucleic acid in the cells set about to decrease and in place 5'-nucleotides began to accumulate in the medium. After 16 hours, the pH of the medium became 9.2 and the content of ribonucleic acid in the cells diminished to about 9 grams to result in the accumulation of 5'-nucleotides in the medium. The quantity of the accumulated 5'-nucleotides at this stage was proved to be about 11 grams by the enzymatical measurement making use of 5'-nucleotidase. After 48 hours, the pH of the medium showed 9.4 and ribonucleic acid in the cells decreased to about 1 gram, and, as the result, 21 grams of 5'-nucleotides were accumulated in the medium. After 50 hours, the suspension was filtered to give 28 liters of filtrate, from which about 19 grams of a mixture of 5'-nucleotides was obtained.

Example 8

Bacillus sp. (ATCC-14552) was incubated at 28° C. in 1 liter of an aqueous medium of pH 7.0 containing 1.0 percent of glycerol, 1.0 percent of casein hydrolyzate, 0.7 percent of dipotassium hydrogen phosphate, 0.2 percent of potassium dihydrogen phosphate, 0.02 percent of magnesium sulfate, 0.1 percent of ammonium sulfate, 1.0 percent of a solution of vitamin B group mixture [1] and 0.05 percent of sodium salt of ribonucleic acid. The inoculated medium was shaken. After 36 hours the pH of the medium turned to 7.6 and after 72 hours further to 7.8–8.5. The medium obtained by shaking was filtered to give 0.9 liter of filtrate, from which 280 milligrams of 5'-adenylic acid, 275 milligrams of 5'-guanylic acid, 211 milligrams of 5'-cytidylic acid and 235 milligrams of 5'-uridylic acid were obtained.

In the process of this example, when the aqueous medium lacks in the sodium salt of ribonucleic acid, less yield of 5'-nucleotides was observed, i.e. no more than 120 milligrams of 5'-adenylic acid, 121 milligrams of 5'-guanylic acid, 92 milligrams of 5'-cytidylic acid and 90 milligrams of 5'-uridylic acid were obtained.

Example 9

Pseudomonas graveolens Levine et Anderson (NRRL, B-14) and Bacillus sp. (ATCC-14552) were respectively incubated for 24 hours at 28° C. in an aqueous medium of pH 7.0 containing 1.0 percent of glucose, 1.0 percent of polypeptone, 0.4 percent of dipotassium hydrogen phosphate, 0.1 percent of potassium dihydrogen phosphate, 0.3 percent of yeast extract, 0.01 percent of magnesium sulfate and 0.1 percent of ammonium sulfate. One hundred milliliters each of both cultures were concomitantly inoculated as seed culture into 30 liters of an aqueous medium containing 2.0 percent of dipotassium hydrogen phosphate, 0.05 percent of potassium dihydrogen phosphate, 0.005 percent of magnesium sulfate and 0.1 percent of ammonium sulfate, and both bacteria were concomitantly incubated for 18 hours at 28° C. After the incubation, there were added to the broth sodium acetate and corn-steep liquor in respective quantities of 1.5 percent relative to that of broth. The mixture was shaken for about 4 to 6 hours, whereupon the pH of the medium began to rise and 5'-nucleotides started to accumulate in the medium. After 18-hour-shaking, the mixture was filtered to give filtrate, from which 15 grams of 5'-adenylic acid, 14 grams of guanylic acid, 12 grams of 5'-cytidylic acid and 11 grams of 5'-uridylic acid were obtained.

Example 10

Rhodotorula glutinis Harrison (NRRL, Y-1091) was incubated for 20 hours at 28° C. in 20 liters of an aqueous medium of pH 6.5 under aeration and agitation, the medium containing 10.0 percent of molasses, 3.0 percent of corn-steep liquor, 0.5 percent of urea, 0.1 percent of di-potassium hydrogen phosphate, 0.6 percent of potassium dihydrogen phosphate, and 0.05 percent of magnesium sulfate, whereupon the pH of the medium shifted to 7.0, which was then further elevated up to 10.5 with sodium hydroxide and the agitation was further continued for additional 5 hours. The resulting mixture was filtered to give filtrate, from which 8.6 grams of 5'-adenylic acid, 5.3 grams of 5'-guanylic acid, 4.7 grams of 5'-cytidylic acid and 4.5 grams of 5'-uridylic acid were obtained.

Example 11

Helminthosporium sigmoideum var. irregulare Cralley et Tullis (ATCC–13406) was incubated for 48 hours at 28° C. in 10 liters of an aqueous medium of pH 6.2 in a tank, the medium containing 5.0 percent of glucose, 0.5 percent of soy-bean flour, 0.05 percent of magnesium sulfate, 0.01 percent of calcium chloride and 0.2 percent of potassium nitrate. After the incubation, the resulting mycelia were collected and suspended in 10 liters of 0.25 molar tris buffer solution of pH 9.0. The suspension was allowed to stand for 5 hours at 37° C. and filtered to give filtrate, from which 0.75 gram of 5'-adenylic acid, 0.72 gram of 5'-guanylic acid, 0.69 gram of 5'-cytidylic acid and 0.71 gram of 5'-uridylic acid were obtained.

Example 12

Aspergillus quercinus Thom et Church (ATCC-14307) was incubated for 72 hours at 28° C. in 10 liters of an aqueous medium in a tank under shaking, the medium being of the same composition as employed in Example 11. After the incubation, the medium showed pH 6.6, which was then elevated up to 10.5 with the addition of sodium hydroxide and the shaking was further continued for additional 4 hours. Then, the mixture was filtered to give filtrate, which was subjected to purification process by adsorption on charcoal powder, elution therefrom, adsorption on anion-exchange resin, elution therefrom, etc. As the result, 1.2 grams of 5'-adenylic acid, 0.95 gram of 5'-guanylic acid, 0.7 gram of 5'-cytidylic acid and 0.75 gram of 5'-uridylic acid were obtained.

Example 13

Streptomyces aureus Waksman et Henrici (ATCC-13404) was incubated for 48 hours at 28° C. in 30 liters of an aqueous medium of pH 6.5 in a tank under shaking, the medium containing 5.0 percent of glucose, 3.0

---

[1] One liter of the solution contains 20 milligrams of vitamin $B_1$, 20 milligrams of vitamin $B_2$, 40 milligrams of nicotinic acid, 40 milligrams of calcium pantothenate, 1 milligram of biotin, 1 milligram of folic acid, 1 milligram of p-aminosalicylic acid, 20 milligrams of vitamin $B_6$ and 20 milligrams of inositol.

percent of corn-steep liquor, 0.5 percent of peptone and 0.05 percent of magnesium sulfate, whereupon the pH of the medium turned to 7.0. The pH was further elevated up to 10.0 with the addition of sodium hydroxide and the shaking was further continued for additional 5 hours. The resulting mixture was filtered to give a filtrate, from which 4.2 grams of 5'-adenylic acid, 2.9 grams of 5'-guanylic acid, 2.3 grams of 5'-cytidylic acid and 2.5 grams of 5'-uridylic acid were obtained.

Having thus disclosed the invention, what is claimed is:

1. A method for producing 5'-nucleotides, which comprises culturing microorganisms in an aqueous nutrient medium containing an assimilable carbon source, a digestible nitrogen source and minerals, and suspending the cultivated microorganisms in alkaline aqueous solution of a pH of 7.5 to 12 at a temperature of 30 to 45° C. until the intracellular ribonucleic acid of the microorganisms is degraded into 5'-nucleotides which come out of the cells and are accumulated in the medium.

2. A method for producing 5'-nucleotides, which comprises culturing microorganisms in an aqueous nutrient medium containing an assimilable carbon source, a digestible nitrogen source and minerals, separating sufficiently grown microorganisms from the culture medium therefor, and suspending the separated microorganisms in a buffer solution being at a pH of 7.5 to 12 at a temperature of 30 to 45° C. until the intracellular ribonucleic acid of the microorganisms is degraded into 5'-nucleotides which come out of the cells and are accumulated in the medium, and recovering therefrom the accumulated 5'-nucleotides.

3. A method for producing 5'-nucleotides, which comprises sufficiently culturing microorganisms in an aqueous nutrient medium containing an assimilable carbon source, a digestible nitrogen source and minerals, adjusting the fermented broth to a pH of 7.5 to 12, keeping the microorganisms suspended in the above-adjusted medium at a temperature of 30 to 45° C. until the intracellular ribonucleic acid of the microorganisms is degraded into 5'-nucleotides which come out of the cells and are accumulated in the medium, and recovering therefrom the accumulated 5'-nucleotides.

4. The method as claimed in claim 1, wherein the suspending is effected at a pH of 8.0 to 11.0.

5. The method as claimed in claim 1, wherein the microorganisms are treated with a chemical agent selected from the group consisting of phenol, cresol and alkali metal deoxycholates.

6. The method as claimed in claim 1, wherein the microorganisms are kept suspended in the presence of a polybasic anion selected from the group consisting of phosphoric anion, pyrophosphoric anion, polyphosphoric anion, arsenic anion and citric anion.

7. The method as claimed in claim 2, wherein the separated microorganisms are suspended after being once frozen and thawed.

8. The method as claimed in claim 1, wherein the microorganisms are bacteria.

9. The method as claimed in claim 1, wherein the microorganisms are yeasts.

10. The method as claimed in claim 1, wherein the microorganisms are fungi imperfecti.

11. The method as claimed in claim 1, wherein the microorganisms are molds.

12. The method as claimed in claim 1, wherein the microorganisms are actinomycetes.

13. The method as claimed in claim 1, wherein the microorganism is Bacillus sp. (ATCC–14552).

14. The method as claimed in claim 1, wherein the microorganism is *Pseudomonas graveolens* Levine et Anderson (NRRL, B–14).

15. The method as claimed in claim 1, wherein the microorganism is *Schizosaccharomyces pombe* Lindner (ATCC–14548).

16. The method as claimed in claim 1, wherein the microorganism is *Saccharomyces miso* δ var. 2 Mogi (ATCC–14549).

17. The method as claimed in claim 1, wherein the microorganism is *Saccharomyces rouxii* Boutroux (ATCC–14550).

18. The method as claimed in claim 1, wherein the microorganism is *Rhodotorula flava* Lodder (ATCC–14551).

19. The method as claimed in claim 1, wherein the microorganism is *Rhodotorula glutinis* Harrison (NRRL, Y–1091).

20. The method as claimed in claim 1, wherein the microorganism is *Helminthosporium sigmoideum* var. *irregulare* Cralley et Tullis (ATCC–13406).

21. The method as claimed in claim 1, wherein the microorganism is *Aspergillus quercinus* Thom et Church (ATCC–14307).

22. The method as claimed in claim 1, wherein the microorganism is *Streptomyces aureus* Waksman et Henrici (ATCC–13404).

References Cited in the file of this patent

Colowick et al.: Methods in Enzymology, volume II, Academic Press, Inc., publishers, 1957, pages 673–674 and 724–725.